(No Model.)

J. B. G. A. CANET.
GUN CARRIAGE.

No. 413,130. Patented Oct. 15, 1889.

5 Sheets—Sheet 1.

Witnesses

Inventor
Jean B. G. A. Canet
By James L. Norris (No Model.) 5 Sheets—Sheet 2.
J. B. G. A. CANET.
GUN CARRIAGE.

No. 413,130. Patented Oct. 15, 1889.

Witnesses:
J. A. Rutherford.

Inventor:
Jean B. G. A. Canet.
By James L. Norris
Atty.

(No Model.)

J. B. G. A. CANET.
GUN CARRIAGE.

No. 413,130. Patented Oct. 15, 1889.

Witnesses
J. A. Rutherford
Robert Burrell

Inventor
Jean B. G. A. Canet.
By James L. Norris.
Atty.

(No Model.)  5 Sheets—Sheet 4.

J. B. G. A. CANET.
GUN CARRIAGE.

No. 413,130.  Patented Oct. 15, 1889.

Witnesses  Inventor
Jean B. G. A. Canet.
By James L. Norris (No Model.)  
5 Sheets—Sheet 5.
J. B. G. A. CANET.  
GUN CARRIAGE.
No. 413,130. Patented Oct. 15, 1889.
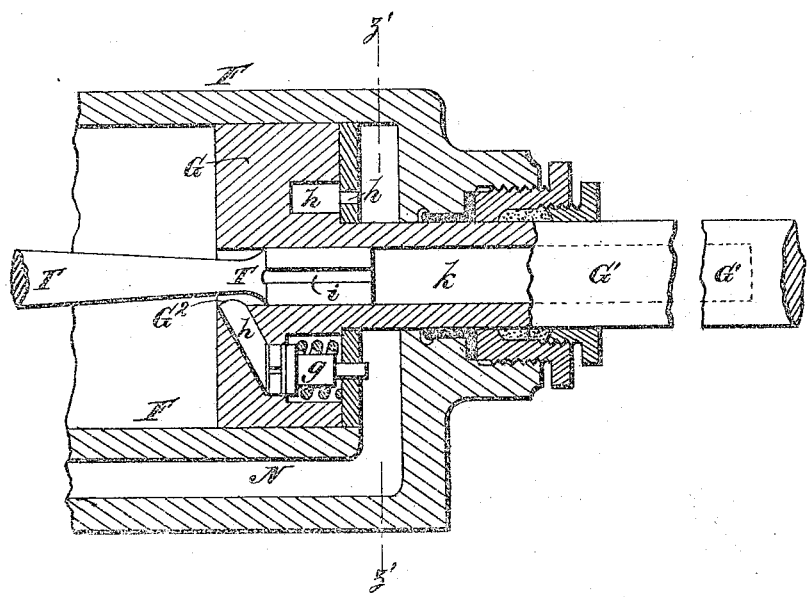
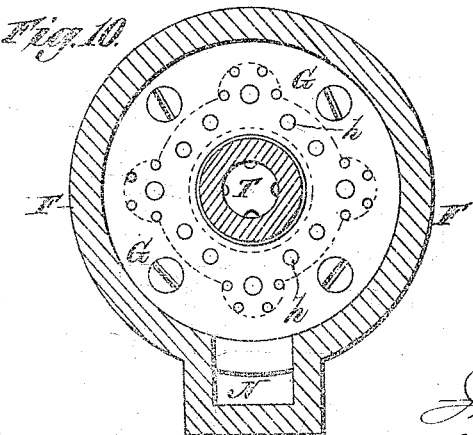
Witnesses:  
J. A. Rutherford  
Dennis Sumby
Inventor:  
Jean B. G. A. Canet  
By James L. Norris  
Attorney.

UNITED STATES PATENT OFFICE.

JEAN BAPTISTE GUSTAVE ADOLPHE CANET, OF PARIS, FRANCE, ASSIGNOR OF ONE-HALF TO SIR JOSEPH WHITWORTH & COMPANY, (LIMITED,) OF MANCHESTER, ENGLAND.

GUN-CARRIAGE.

SPECIFICATION forming part of Letters Patent No. 413,130, dated October 15, 1889.

Application filed June 21, 1888. Serial No. 277,733. (No model.) Patented in France March 1, 1887, No. 181,898, and in England June 27, 1887, No. 9,125.

*To all whom it may concern:*

Be it known that I, JEAN BAPTISTE GUSTAVE ADOLPHE CANET, engineer, a citizen of the Republic of France, and a resident of Paris, France, have invented new and useful Improvements in and Relating to Gun-Carriages, (for which I have obtained patents in Great Britain, No. 9,125, dated June 27, 1887, and France, No. 181,898, dated March 1, 1887,) of which the following is a specification, reference being had to the accompanying drawings.

My invention relates to gun carriages or mountings, and has for its main object to provide improved means for allowing the gun, through the effect of the recoil, to disappear or descend behind or below a parapet or wall at or immediately after the moment of firing, while preserving the advantages obtained by the use of brake and recuperative apparatus for controlling the recoil of the gun and regulating its return to the firing position. Moreover, I provide for converting to a great extent the downward stresses due to the recoil into horizontal stresses.

My improved gun-carriages can be employed on land, and under certain circumstances on board ship, mounted upon any suitable platform or racer, either with or without wheels, rollers, or balls.

The said invention is illustrated in the accompanying drawings, in which—

Figure 1:
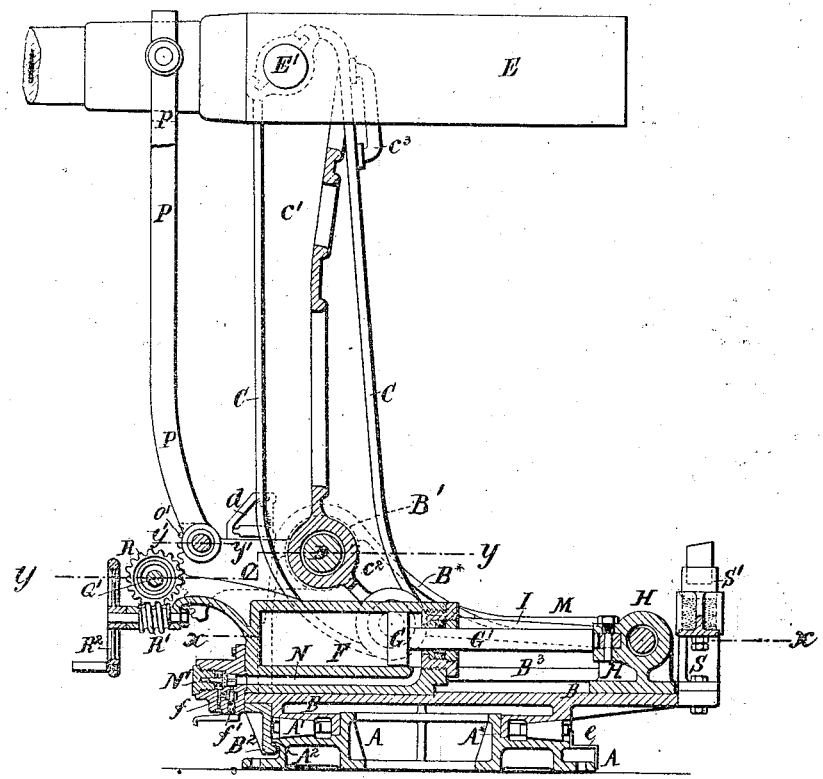
Figure 2:
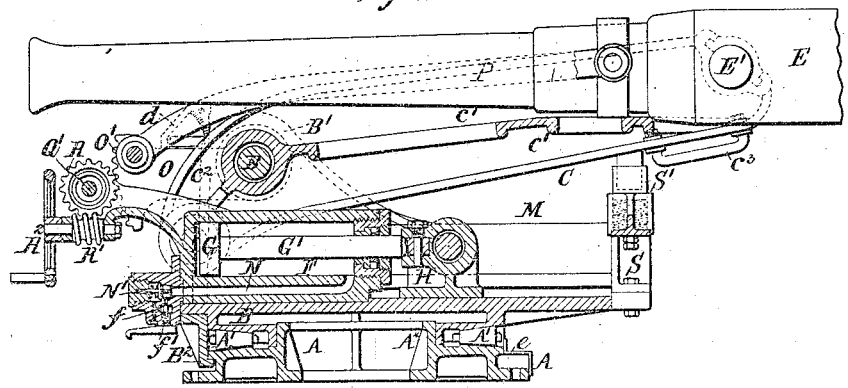
Figure 4:
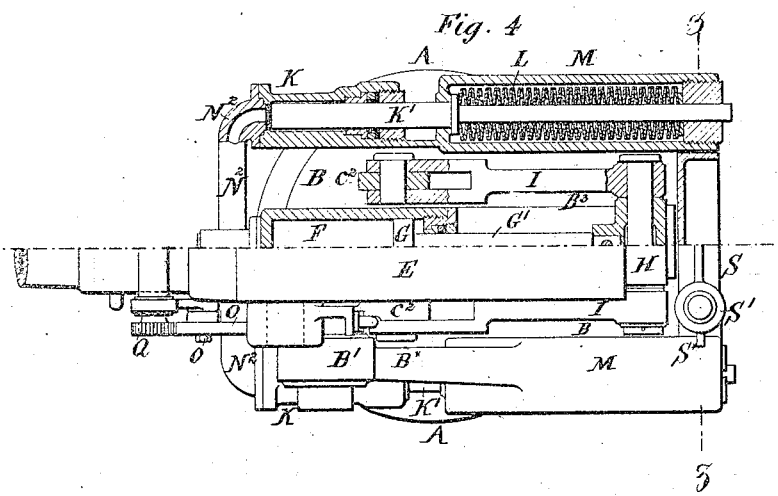
Figure 5:
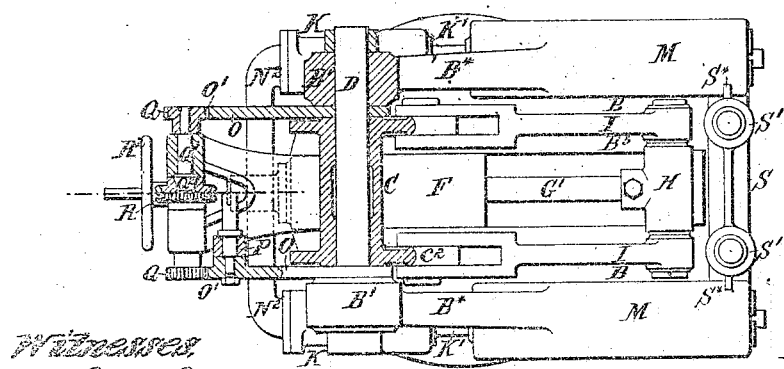
Figure 3:
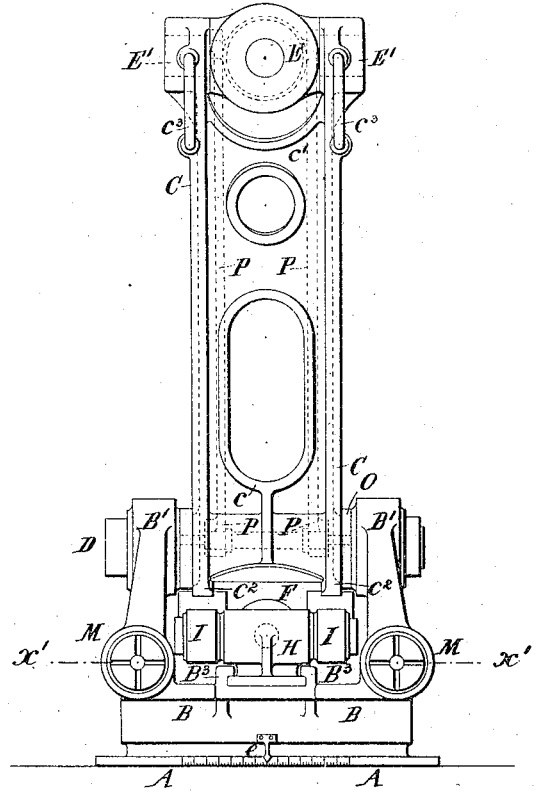
Figure 6:
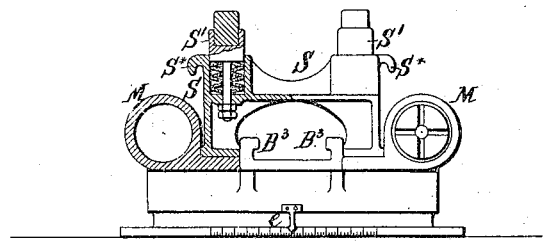
Figure 7:
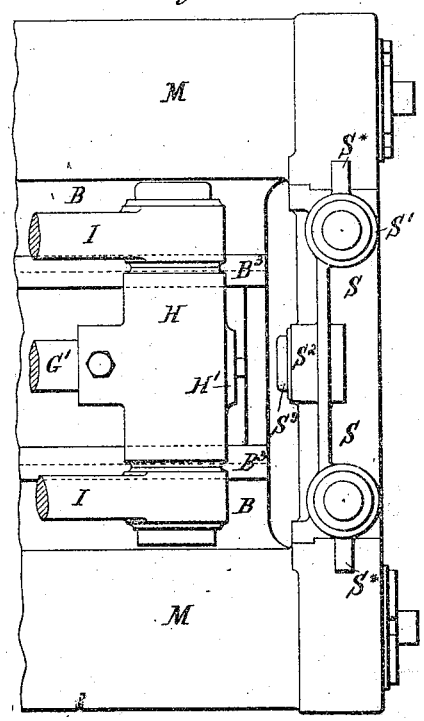

Figure 1 is a vertical longitudinal central section of one form of my improved gun-carriage, showing the gun in the firing position. Fig. 2 is a similar view showing the gun in its recoiled position. Fig. 3 is a rear elevation of the said carriage, the buffer-beam hereinafter referred to being removed. Fig. 4 is a plan, partly in horizontal section, on the line $x\, x$, Fig. 1, and partly in horizontal section on the line $x'\, x'$, Fig. 3. Fig. 5 is a plan partly in horizontal section on the line $y\, y$ and partly in horizontal section on the line $y'\, y'$, Fig. 1. Fig. 6 is partly a rear elevation and partly a transverse section on the line $z\, z$, Fig. 4, some of the parts being removed. Fig. 7 is a plan, and Fig. 8 a rear elevation, both drawn to an enlarged scale, illustrating a modification of my invention. Fig. 9 is a longitudinal central section, and Fig. 10 a transverse section, on the line $z'\, z'$, Fig. 9, illustrating a convenient form of hydraulic brake for use in my improved gun-mounting.

Like letters indicate corresponding parts throughout the drawings.

A is the base-plate or racer, which in a center-pivot mounting is made with a central projection or pivot $A^*$.

B is the platform or turn-table, which is supported on the said base-plate through the medium of the rollers $A'$, (or otherwise,) so that it may be rotated thereon.

C is a rocking or oscillating lever, which is mounted upon a fulcrum-pin or pivot-pin D, carried in bearings $B'$, formed in the brackets $B^*$ on the turning platform or turn-table B. The lever C is shown as a single casting. It may, however, be built up, if desired. For example, it may be formed of two side pieces connected by transoms. The gun E is supported, preferably, by trunnions $E'$ in the long arm $c'$ of the rocking lever C.

The platform or turn-table B has attached to a portion of its periphery one or more flanged clips $B^2$, which engage with a flange $A^2$ on the base-plate or racer A and prevent the lifting or tilting of the said platform or turn-table.

The platform or turn-table B carries the brake apparatus for controlling the recoil. This brake apparatus is constructed as follows, viz: It has a cylinder F, in which works a piston G, having in it variable orifices or apertures. These orifices may be controlled by any well-known or suitable device. The piston-rod $G'$ is connected with a cross-head H, which moves in guides $B^3$ on the platform or turn-table B, and which is coupled, by means of two connecting-rods I, to the short arm $c^2$ of the rocking lever C. On each side of the brake-cylinder F is a recoil-press K, provided with a plunger $K'$, which acts upon and is acted upon by a spring or springs L, (preferably so-called "Belleville springs,") inclosed in a cylinder or casing M. These recoil-presses and springs act as recuperators—that is to say, during the recoil they store up energy to be subsequently utilized for effecting the return of the gun to the firing position. The piston G may, if desired, act through the medium of the liquid on pistons or plungers working in cylinders charged with air for the purpose of compressing the air and causing it to act as a recuperator. Communication between the brake-cylinder F and the presses K is established through a pipe or passage N, provided with a loaded valve N', and pipes or passages $N^2$, extending therefrom to the said presses, and through a by-pass $f$, provided with an adjustable or regulating valve $f'$, as hereinafter described.

Upon the fulcrum-pin or pivot-pin D of the rocking lever C are loosely mounted arms or levers O, the upper or outer extremities of which are connected to the gun by rods or links P. The said arms or levers are formed or otherwise provided with toothed segments O', which are geared with pinions Q, fixed upon a shaft Q'. A worm-wheel R, arranged upon this shaft, is geared with a worm R', provided with a hand-wheel $R^2$ for rotating it, and is connected with the shaft Q' by means of the well-known device of friction cones or clutches $Q^2$, for the purpose hereinafter specified. By turning the hand-wheel $R^2$ the worm-wheel R may be operated to impart motion to the shaft Q' and pinions Q through the medium of the friction-cones $Q^2$, and the vertical pointing or elevation of the gun or movement of the same about its trunnions will be thereby effected.

The arms O and rods P, arranged in combination with the gun and the rocking lever, as above described, form a jointed parallelogram, whereby the gun in its recoil, unless subjected to abnormal or exceptionally severe stresses, is kept parallel to the line of fire, and by making the vertical angle of the gun dependent upon the position of and controllable through the arms O, I am enabled to effect the elevation or depression without impairing or changing the action of the parallelogram in respect of preventing deviation of the gun from the line of fire in its recoil or in its return to the firing position. Moreover, the elevating mechanism is behind or below the wall or parapet. Therefore the elevation or depression of the gun can be effected without exposure of the gunners to an enemy's fire.

By employing the friction cones or clutches $Q^2$ between the worm-wheel R and shaft Q', I provide for preventing injury to the elevating mechanism by concussion when abnormal or excessive stresses occur, any vertical movement of the gun about its trunnions when fired causing the rotation of the shaft Q' and cones $Q^2$ without affecting the worm-wheel R and worm R'.

It will be seen that in the mounting shown in Figs. 1 to 6 the elevating mechanism and the mechanism for keeping the gun parallel to the line of fire in its recoil and in its return movement are arranged forward of the trunnions. By this arrangement I am enabled to make the mounting very compact. I wish it understood, however, that I can, though with less advantage, arrange the said mechanism in rear of the trunnions.

The training of the gun is effected by the rotation of the turn-table, which can be performed by hand or by any suitable mechanism.

At the rear of the platform B is a buffer-beam S, which carries two spring buffers or cushions S' or hydraulic or other suitable buffers, upon which the rocking or oscillating lever C abuts or impinges when the gun has descended to the extreme position of recoil. Two ears or hooks S* are cast on the buffer-beam S to allow of the lever C being lashed or secured in the recoiled position. The lever C is, moreover, provided with eyes $c^3$ for this purpose.

To allow the gun-lever to be operated without firing, I provide for permitting the escape of liquid from the cylinder to allow the gun to descend, and I use a pump for introducing liquid into the said cylinder to again raise the gun to the firing position, or I use any other suitable devices for this purpose.

An indicator $d$ is arranged upon one or upon each of the arms or levers O, the upper surface of which is always in a plane parallel to the axis of the gun, and another indicator or pointer $e$ is placed at the rear of the turn-table. These indicators afford convenient means for observing and facilitating the directing of the movements of the gun. Any well-known or suitable arrangement of reflector-sights may, if desired, be applied to my gun-mounting.

The gun in its recoil is displaced in such a manner that throughout its downward movement (unless slipping of the frictional device should occur) it will, as above stated, remain parallel to its firing position by reason of its connection with the rocking lever C and with the arms or levers O. Moreover, it will during its upward or return movement remain unchanged in respect of its angle of elevation. Therefore it can be adjusted or approximately adjusted to any desired angle of elevation while in the recoiled position—that is to say, before it appears above its parapet.

During the downward movement of the gun the short arm $c^2$ of the rocking lever C acts, through the medium of the connecting-rods I and cross-head H, upon the piston-rod G' and piston G of the brake, which are thus moved forward in the cylinder F, and a volume of liquid is displaced by the progressive immersion of the said rod, this liquid passing through the orifices in the piston and through the passage N and, after having lifted the loaded valve N', through the passages $N^2$ to the recoil-presses or recuperator-cylinders K. At the termination of the recoil the valve N' closes, and the gun is rendered temporarily immovable within the shelter of the pit, during which time the loading may be effected.

To effect the return of the gun to the firing position, communication is established between the cylinder F and the recoil-presses K through the by-pass or passage $f$ by means of the regulating-valve $f'$. The liquid, by reason of the pressure of the springs L on the plungers K', is forced from the recuperators K into the cylinder F and through the variable orifices in the piston G, and moves the said piston backward, thereby returning the gun to the firing position with a velocity which can be regulated or controlled by means of the said regulating-valve $f'$ and the variable orifices in the piston. The final adjustment of the gun for elevation can then, if necessary, be effected through the medium of the above-described gearing by turning the hand-wheel $R^2$.

Figure 8:
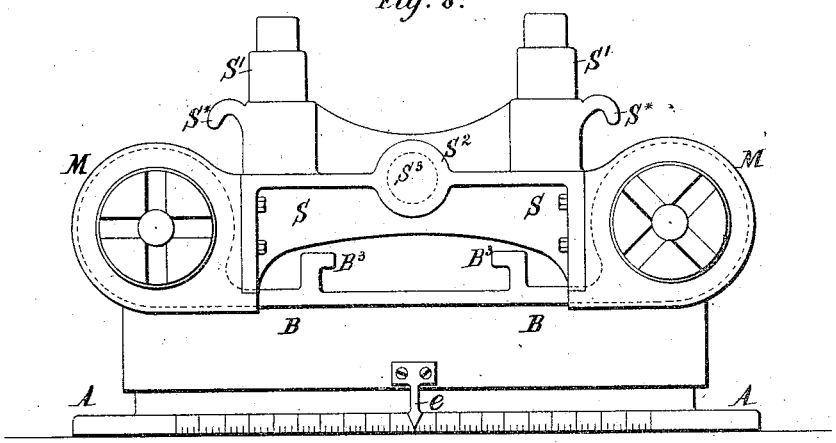

In Figs. 7 and 8 I have shown a modification of my improved carriage or mounting, wherein the buffer-beam S is fitted between and firmly secured to the cylinder M, and is provided with a socket $S^2$, in which is inserted a spring buffer or cushion $S^3$ or a hydraulic or other suitable buffer. The cross-head H is formed with a projection H', which, at the termination of the upward movement of the gun—that is to say, when the gun reaches its firing position—will impinge against the buffer or cushion $S^3$, which will diminish any shock or concussion.

Any suitable brake and recuperative apparatus may be used in my improved gun-mounting. I prefer, however, to use, in combination with the recuperative apparatus herein described, a hydraulic brake wherein the liquid flows from one to the other side of the piston through orifices in or around the same.

Figs. 9 and 10 show a hydraulic brake suitable for my purpose. In this brake the piston-rod G' is hollow, and has arranged therein a rod T of unequal or varying diameter. This rod is firmly secured in the forward end of the cylinder A, and is designed to afford the means for varying the transverse sectional area of the annular orifice or passage $G^2$ between the said rod T and the piston G, for the purpose of varying the resistance to the flow of liquid through the said orifice or passage, and thus regulating or controlling the recoil of the gun. At the commencement of the recoil the liquid opens the spring-loaded valves $g$ in the piston G, and passes from the space in front of the piston through the orifices or passages $G^2$ $h$ to the rear of the said piston.

In the apparatus shown in Figs. 9 and 10 grooves or orifices $i$ are formed in the rod T to permit the flow of liquid to and from the space $k$ in the hollow rod G'. Small orifices or grooves are formed in the valves $g$ or in the seats of the said valves to permit the passage of liquid from one to the other side of the piston during the return of the gun to the firing position. The velocity of this return movement will in some measure depend upon or be governed by the size of these orifices. The rod T will enter the piston-rod G' during the recoil of the gun. Therefore the resistance offered to the flow of liquid through the grooves $i$ will assist in checking or controlling the recoil. It will be seen that in the recoil of the gun the valves $g$ will be opened and the liquid will flow through the orifices or passages $G^2$ $h$; but the resistance to the flow of the said liquid will be varied during the recoil by the taper rod T, and the pressure in the cylinder thus equalized or nearly equalized throughout the recoil. Moreover, the return of the gun to the firing position will be retarded as required. This brake apparatus is fully described and claimed in the specification accompanying my application, No. 301,378, for Letters Patent of the United States. Any of the brakes described in the said specification are advantageous for the purpose of my present invention.

I prefer to provide a cover or shield over the pit to protect the gun, men, and mounting against injury by small projectiles. This shield may be so arranged that it will be rotated with the gun and mounting, and the gun can rise and descend through an opening in the said shield, which may be fitted with shutters or slides to close the opening when the gun is down.

Although I have hereinbefore described my improvements as applied to center-pivot gun-carriages, I wish it understood that my said improvements are also applicable to forward-pivot gun-carriages—that is to say, I do not confine myself to the particular arrangement shown in Figs. 1, 2, and 3. I may mount the platform or turn-table on any suitable base or racer-path either for all-round fire or for any arc of a circle. Moreover, the construction of my improved gun carriage or mounting may be otherwise modified if desired. For instance, I may employ other gearing than that shown in the drawings for operating the arms or levers O to elevate or depress the gun.

Having now particularly described and ascertained the nature of my said invention and in what manner the same is to be performed, I wish it understood that I am aware that the mounting of a gun upon an arm or lever arranged in combination with hydraulic or other brake or controlling apparatus and the employment of a parallel arrangement of bars or rods for keeping the gun in its recoil parallel to its firing position are features or devices which have already been used or known, and I therefore do not claim these devices otherwise than as forming parts or elements of the improvements hereinabove described; but

I claim—

1. In a carriage or mounting for a disappearing gun, the combination of a rocking lever on which the gun is supported, arms or levers loosely mounted on the fulcrum-pin of the said rocking lever and provided with toothed segments, rods or links connecting the said arms or levers with the gun in such a manner that, together with the said arms or levers, the rocking lever, and the gun, they form a parallelogram, and pinions geared with said toothed segments and connected with elevating-gear, substantially such as above described, whereby the gun, after disappearing and before returning to its firing position, can be adjusted to or nearly to the angle of elevation at which it is to be fired, but which will yield to abnormal or excessively severe stresses and thus prevent straining or breaking of the parts by the recoil, substantially as described.

2. In a carriage or mounting for a disappearing gun, the combination of a rocking lever on which the gun is supported, arms or levers loosely mounted on the fulcrum-pin of the said rocking lever and provided with toothed segments, rods or links connecting the said arms or levers with the gun in such manner that, together with the said arms or levers, the rocking lever, and the gun, they form a parallelogram, and pinions geared with the said toothed segments and connected with elevating-gear by means of friction cones or clutches, substantially as described.

3. In a carriage or mounting for a disappearing gun, the combination of a rocking lever on which the gun is supported, and which in the recoil turns through an angle of about ninety degrees, a hydraulic brake the piston of which is connected with the short arm of the said lever below its fulcrum, recuperative apparatus comprising hydraulic cylinders, communicating by a pipe or passage with the cylinder of the said brake and having rams or plungers connected with elastic resisting devices, substantially such as above described, a loaded valve in the said pipe or passage, and an adjustable valve in a by-pass around the said loaded valve, substantially as described.

4. In a carriage or mounting for a disappearing gun, the combination, with the rocking lever, the hydraulic brake, and the recuperative apparatus connected therewith, substantially as described, of a cross-head fixed on the piston-rod of the said brake and a buffer or cushion against which the said cross-head will impinge when the gun reaches its firing position, substantially as described.

5. The combination, with the gun, of the rocking lever C, having the fulcrum-pin D, the arms or levers O, loosely mounted on the said fulcrum-pin and provided with toothed segments O', rods or links P, connecting the said arms or levers with the gun, pinions Q, geared with the said toothed segments and fixed upon shafts Q', friction cones or clutches Q², a worm-wheel R, connected thereby with the said shafts, and a worm R', geared with the said worm-wheel and provided with a hand-wheel R² for actuating it, substantially as described.

6. The combination, with the gun, of a rocking lever on which the said gun is supported, and which in the recoil turns through an angle of about ninety degrees, the pivot or fulcrum pin of the said lever being situated in rear of the point of connection of the gun therewith when the said lever is at the forward or upper extremity of its stroke or movement, arms or levers loosely mounted on said fulcrum-pin and provided with toothed segments, rods or links connecting the said arms or levers with the gun in such a manner that, together with the said arms or levers, the rocking lever, and the gun, they form a parallelogram, and pinions geared with the said toothed segments and connected with elevating-gear, substantially as described, so that the gun, after disappearing and before returning to its firing position, can be adjusted to or nearly to the angle of elevation at which it is to be fired, substantially as and for the purpose set forth.

7. In a carriage or mounting for a disappearing gun, the combination, with a rocking lever supporting the gun and a hydraulic brake connected with the short arm of the said lever below the fulcrum thereof, and the piston of which has orifices in or around the same, of two recuperators arranged one on each side of the said brake, and each comprising a ram or plunger working in a cylinder in communication with the brake-cylinder and elastic resisting devices connected with the said plunger, substantially as and for the purpose set forth.

8. The combination, with the gun and the rocking lever C, of the hydraulic brake F, the cross-head H, fixed on the piston-rod G' of the said brake and working in guides B³, the rods or links I, connecting the said cross-head with the short arm of the said rocking lever, and recuperative apparatus comprising a ram or plunger working in a cylinder in communication with the brake-cylinder and elastic resisting devices connected with the said plunger, all substantially as and for the purposes set forth.

9. In a carriage or mounting for a disappearing gun, the combination, with a rocking lever supporting the gun and a hydraulic brake connected with the said lever, and the piston of which has orifices in or around the same, of a hydraulic cylinder K, communicating with the said brake by a pipe or passage provided with a loaded valve, a ram or plunger K', working in the said cylinder, and springs L, acting upon the said plunger, substantially as described.

10. In a carriage or mounting for a disappearing gun, the combination, with a rocking lever for supporting the gun and a hydraulic brake connected with the said lever, of a recuperator-cylinder communicating by a pipe or passage with the brake-cylinder, a ram or plunger working in the said recuperator-cylinder, elastic resisting devices connected with the said plunger, a loaded valve in the said pipe or passage, a by-pass around the said loaded valve, and an adjustable valve for controlling the flow of liquid through the said by-pass, substantially as and for the purposes set forth.

11. In a carriage or mounting for a disappearing gun, the combination of the turntable B, the brake F, the pipes or passages N N², the loaded valve N', the by-pass $f$, the valve $f'$, the cylinders K, provided with the plungers K', the boxes M, containing the springs L, the bearings B', the fulcrum-pin D carried thereby, and the rocking lever C, mounted upon the said fulcrum-pin and supporting the gun, substantially as described.

12. In a carriage or mounting for a disappearing gun, the combination of the turntable B, the brake F, the pipes or passages N N², the loaded valve N', the by-pass $f$, the valve $f'$, the cylinders K, provided with the plungers K', the boxes M, containing the springs L, the bearings B', the fulcrum-pin D carried thereby, the rocking lever C, mounted upon the said fulcrum-pin and supporting the gun, the arms or levers O, and toothed segments O', the rods or links P, the pinions Q, the shafts Q', friction cones or clutches Q², and elevating-gear connected thereby with the said shafts, substantially as described.

13. In a carriage or mounting for a disappearing gun, the combination of a rocking lever, arms or levers loosely mounted on the fulcrum-pin of the said rocking lever and provided with toothed segments, rods or links connecting the said arms or levers with the gun in such a manner that, together with the said arms or levers, the rocking lever, and the gun, they form a parallelogram, pinions geared with the said toothed segments and connected with elevating-gear, a hydraulic brake the piston of which is connected with the short arm of the said rocking lever below its fulcrum, recuperative apparatus comprising hydraulic cylinders communicating by a pipe or passage with the cylinder of the said brake and having rams or plungers connected with springs, a loaded valve in the said pipe or passage, and an adjustable valve in a by-pass around the said loaded valve, substantially as described.

In testimony whereof I have hereunto signed my name in the presence of two subscribing witnesses.

JEAN BAPTISTE GUSTAVE ADOLPHE CANET.

Witnesses:
    ROBT. M. HOOPER,
    R. J. PRESTON.